G. F. JAUBERT.
PROCESS OF MANUFACTURING HYDROGEN.
APPLICATION FILED JULY 19, 1911.

1,037,919.  Patented Sept. 10, 1912.
3 SHEETS—SHEET 1.

Inventor: George Francois Jaubert
By Pennie, Davis & Goldsborough
Attys.

Figure 1:
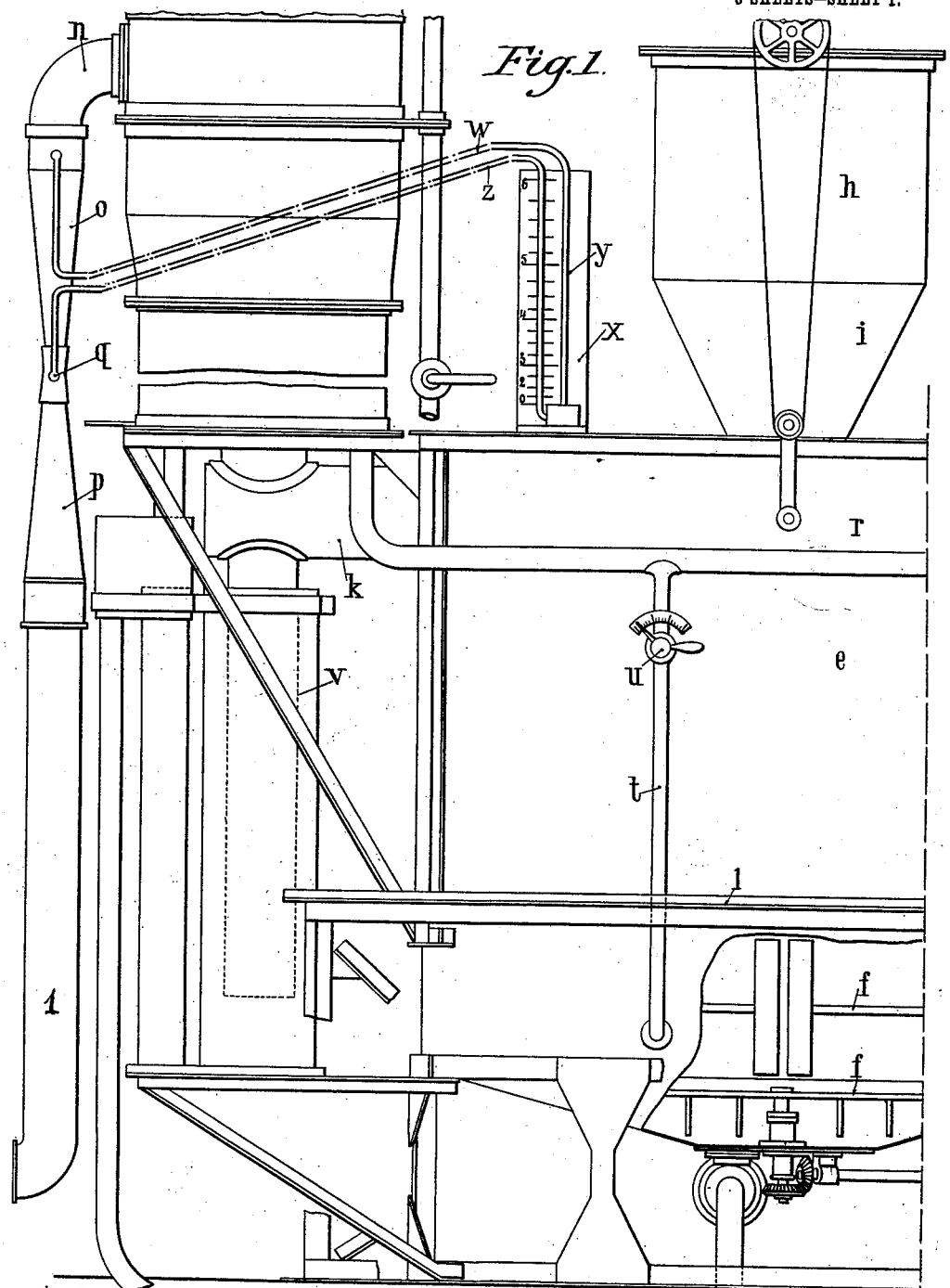

G. F. JAUBERT.
PROCESS OF MANUFACTURING HYDROGEN.
APPLICATION FILED JULY 19, 1911.
1,037,919.
Patented Sept. 10, 1912.
3 SHEETS—SHEET 2.
Fig. 1ª
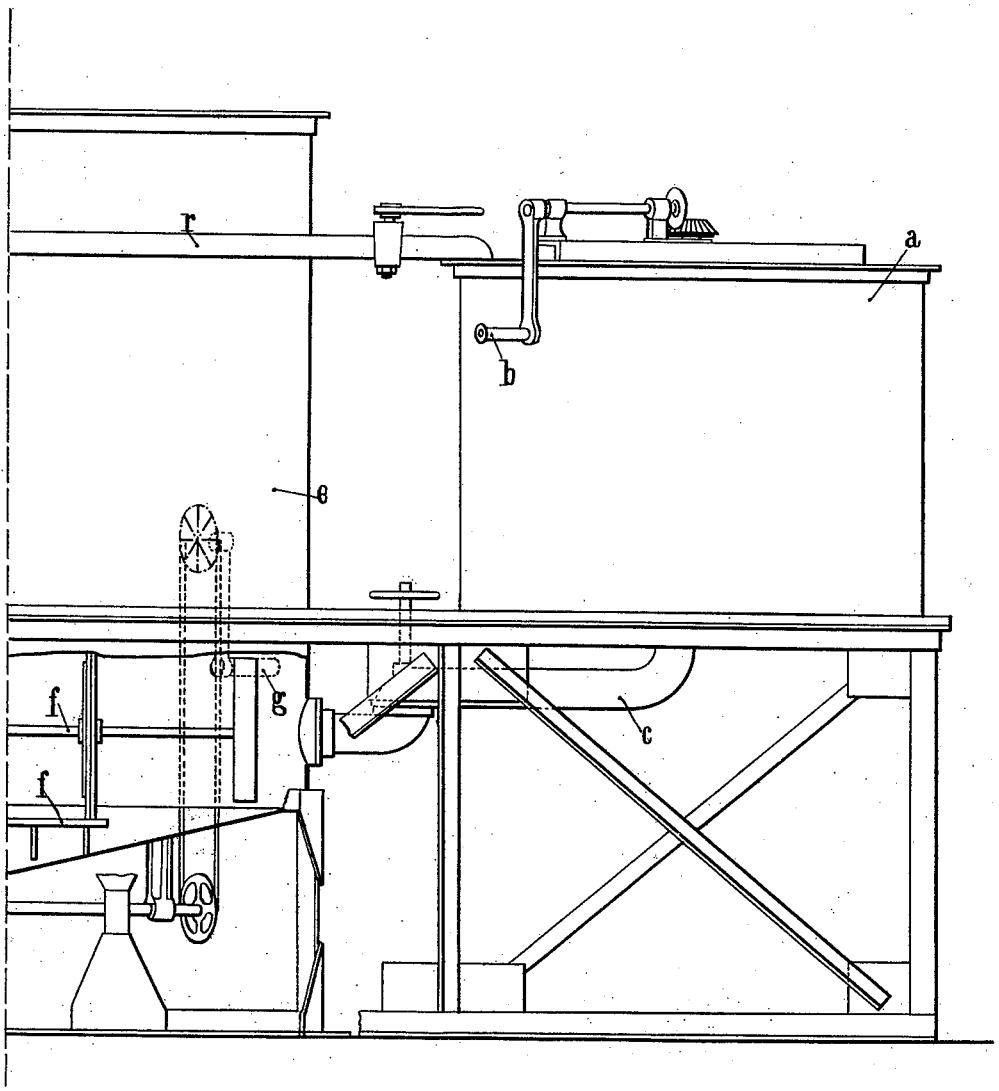

G. F. JAUBERT.
PROCESS OF MANUFACTURING HYDROGEN.
APPLICATION FILED JULY 19, 1911.

1,037,919.

Patented Sept. 10, 1912.
3 SHEETS—SHEET 3.

UNITED STATES PATENT OFFICE.

GEORGE FRANÇOIS JAUBERT, OF PARIS, FRANCE.

PROCESS OF MANUFACTURING HYDROGEN.

1,037,919. Specification of Letters Patent. Patented Sept. 10, 1912.

Application filed July 19, 1911. Serial No. 639,308.

*To all whom it may concern:*

Be it known that I, GEORGE FRANÇOIS JAUBERT, of 155 Boulevard Malesherbes, Paris, France, have invented certain new and useful Improvements in and Relating to an Improved Process of Manufacturing Hydrogen, of which the following is a specification.

This invention relates to an improved process of manufacturing hydrogen by a wet process and is particularly characterized by the fact that combinations or alloys of silicon are caused to act upon a solution of caustic alkali of high specific heat (with a high boiling point) with the object of retaining and storing in this solution itself all the heat liberated by the reaction which arises in the combination of silicon with the alkali in such a manner as to dispense with any added heat due to external heating. With a similar object pure silicon in the form of powder has already been heated to boiling point with a dilute solution of caustic soda but this method presents the capital defect (having regard to the low specific heat of the dilute solution employed) of volatilizing the water of the solution during the reaction of the silicon upon the soda and of therefore necessitating the provision of supplementary heat from an external source. This source, which is, generally speaking, a steam generator increases the bulk of the apparatus and consequently renders it difficult to transport for certain purposes such as the inflation of balloons for example.

Figure 2:
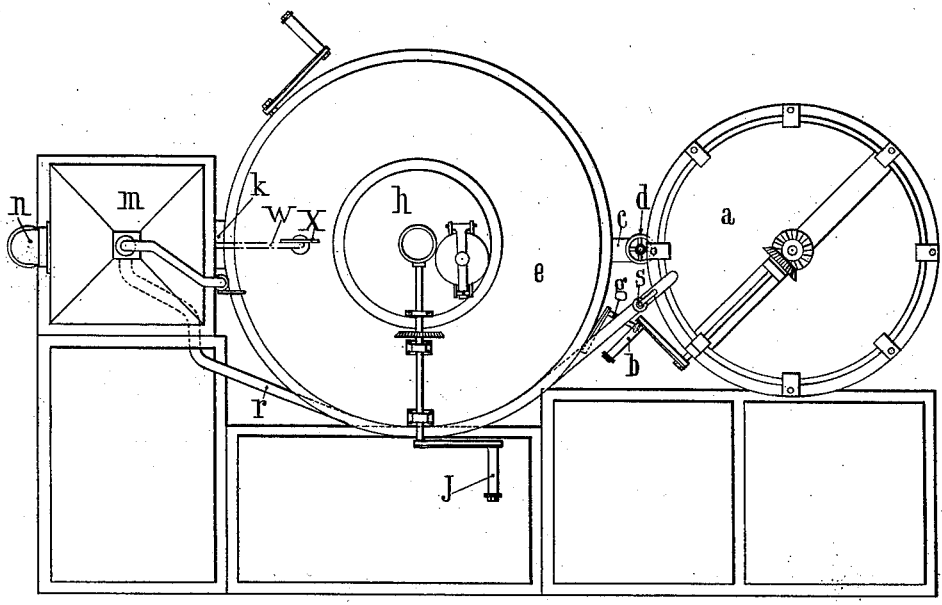

In the accompanying drawing which represents an installation for carrying the process into practice:—Figures 1 and 1ᵃ are elevations, and Fig. 2 is a plan.

In the manufacture a tank $a$ provided with an agitator $b$ is utilized for the preparation of the solution of caustic soda. A pipe $c$ having a cock or valve $d$, connects the lower part of the tank $a$ with the lower part of the gas generator $e$. A sun and planet agitator $f$ driven by a crank $g$ is arranged in the lower part of the gas generator $e$. The hopper $i$ of the vessel $h$ is provided with a distributer having an operating handle $j$, so that the alloy of silicon contained in the vessel and hopper is distributed within the gas generator. By means of a pipe $k$ proceeding from its upper part the generator $e$ communicates with a scrubber condenser $m$ provided with a gas discharge connection $n$ connected with a system of two conical pipes $o$, $p$ connected at their apices at $q$ and communicating with the utilization main $l$.

The pipe $r$ having the cock $s$ connects the lower part of the condenser scrubber $m$ with the tank $a$ containing the solution of soda, and with the pipe $t$ having the graduated cock $u$ and leading to the gas generator $e$. The pipe $v$ forms a hydraulic seal for the gas generator $e$ in such a manner as to constitute a safety valve therefor. The installation comprises a water pressure gage $x$ the two branches $w$ $z$ of which are connected with the pipe $o$ and with the throttled part $q$ respectively.

The operation is as follows: The soda in the form of lumps, cylinders or plates is introduced into the tank $a$ with from one and a half to twice its weight of water; the agitator $b$ is then operated; the soda is dissolved with a sufficient liberation of heat to raise the temperature to about 60 or 80° C. The solution is then conducted into the generator $e$ through the pipe $c$ and should reach it at a temperature sufficient for starting the reaction on contact with the alloy of silicon. The sun and planet agitator $f$ brings the silicon powder alloy coming from the hopper $i$ into intimate contact with the solution of caustic soda without enabling it to accumulate at the center of the generator. The hydrogen gas which is liberated at a high temperature proceeds through the pipe $k$ into the condenser scrubber $m$ where it is deprived of the water vapor that it contains and is simultaneously cooled. This hydrogen then escapes through the connection $n$ and proceeds to the utilization apparatus. The water that has served to cool the gas in the scrubber condenser $m$ is recovered and directed through the pipes $r$ and $t$ respectively into the tank $a$ and into the generator $e$ in accordance with requirements. On the passage of the gas through the conical pipes $o$ $p$ there is produced at the restricted or throttled portion $q$ a partial vacuum due to the increase at the velocity with which the gas passes this point so that the pressure gage $x$ will indicate a higher pressure as the supply of gas increases.

The advantages are as follows: The utilization of a combination or alloy of silicon in which the price of the unit of silicon is very low in comparison with that of commercially pure silicon as hitherto employed with the same object permits of largely reducing the cost of the hydrogen. In employing a dilute solution of caustic soda neutral silicate of soda is formed while with a concentrated solution an acid silicate poorer in soda is formed thereby effecting an economy of caustic soda and permitting of obtaining non-caustic residues which can be utilized in dyeing and bleaching. The water pressure gage can be connected by means of a suitable control with the distributer for the powdered silicon alloy so as to cause the quantity of this substance distributed to vary automatically in accordance with the consumption. The alloys or combinations of silicon which have given good results are ferro-silicon, mangano-silicon or silico spiegels. Caustic soda has been indicated as the caustic solution but a concentrated solution of caustic potash or a concentrated solution of sulfate of potash or of soda containing caustic alkali might equally well be employed.

The invention is applicable to the preparation of hydrogen gas particularly in the field for the inflation of balloons of all kinds either spherical or dirigible.

Having now particularly described and ascertained the nature of my said invention and in what manner the same is to be performed, I declare that what I claim is:—

1. The process for manufacturing hydrogen, which consists in causing a solution of caustic alkali of high specific heat (that is, of high boiling point) to act upon an alloy of silicon in such a manner as to retain in the solution the heat liberated by the reaction and thereby render unnecessary the application of external heat.

2. The process for manufacturing hydrogen, which consists in causing a solution of caustic alkali of high specific heat (that is, of high boiling point) and in an agitated state to act upon an alloy of silicon in such a manner as to retain in the solution the heat liberated by the reaction and thereby render unnecessary the application of external heat.

3. The process for manufacturing hydrogen, which consists in causing a solution of caustic alkali of high specific heat (that is, of high boiling point) to act upon an alloy of silicon, then washing and cooling the hydrogen with water, and utilizing the heated water in dissolving the caustic alkali to form a solution thereof.

In testimony whereof I have hereunto placed my hand at Paris, France, this eleventh day of July 1911.

GEORGE FRANÇOIS JAUBERT.

In the presence of two witnesses:
Louis Coquillat,
H. C. Coxe.

---

Copies of this patent may be obtained for five cents each, by addressing the "Commissioner of Patents, Washington, D. C."